(12) United States Patent
Parker

(10) Patent No.: US 7,510,467 B1
(45) Date of Patent: Mar. 31, 2009

(54) SHELLFISH HOLDING DEVICE

(76) Inventor: Dale Wells Parker, 1008 Larkin Way, Napa, CA (US) 94558

( * ) Notice: Subject to any disclaimer, the term of this patent is extended or adjusted under 35 U.S.C. 154(b) by 0 days.

(21) Appl. No.: 11/966,253

(22) Filed: Dec. 28, 2007

(51) Int. Cl.
*A22C 29/04* (2006.01)

(52) U.S. Cl. ....................................................... 452/17

(58) Field of Classification Search .................. 452/1, 452/6, 12, 13, 102, 103, 194–196, 185, 187; 269/287, 54.4, 54.5, 289 R, 303, 308, 309
See application file for complete search history.

(56) References Cited

U.S. PATENT DOCUMENTS

| | | | |
|---|---|---|---|
| 299,756 A | * 6/1884 | Drake | 452/185 |
| 2,612,653 A | * 10/1952 | Labat | 452/13 |
| 3,755,855 A | * 9/1973 | Ouw et al. | 452/13 |
| 4,348,788 A | * 9/1982 | Jurcak | 452/16 |
| 4,977,644 A | * 12/1990 | Evans et al. | 452/195 |
| 7,207,132 B1 | * 4/2007 | Parsons | 43/4 |

* cited by examiner

*Primary Examiner*—Thomas Price

(57) ABSTRACT

An inexpensive one-piece molded apparatus for holding shellfish during the shellfish-opening process that provides reliable and safe shellfish holding capacity along with substantially increased convenience of use in a design with extremely low cost of individual production. The device is steadied onto a flat horizontal or vertical surface by hand or by connectors such as screws. A person places a shellfish into the invention and uses a knife or other similarly shaped sharp object to open the shellfish. The invention comprises a base supporting a shellfish resting area with securing ridges and liquor drainage holes. Embodiments include securing flanges and flushing holes.

6 Claims, 6 Drawing Sheets

SHELLFISH HOLDING DEVICE

DEFINITION TABLE

| Term | Definition |
| --- | --- |
| 10 | Shellfish holding device |
| 20 | Rearward wall |
| 25 | Horizontal surface |
| 30 | Shellfish resting area |
| 40 | Forward wall |
| 50 | Base |
| 60 | Liquor drainage holes |
| 70 | Flushing holes |
| 80 | Vertical securing flanges |
| 90 | Horizontal securing flanges |
| 100 | Screw down hole |
| 110 | Securing ridges |

DETAILED DESCRIPTION OF EMBODIMENTS

Figure 3:
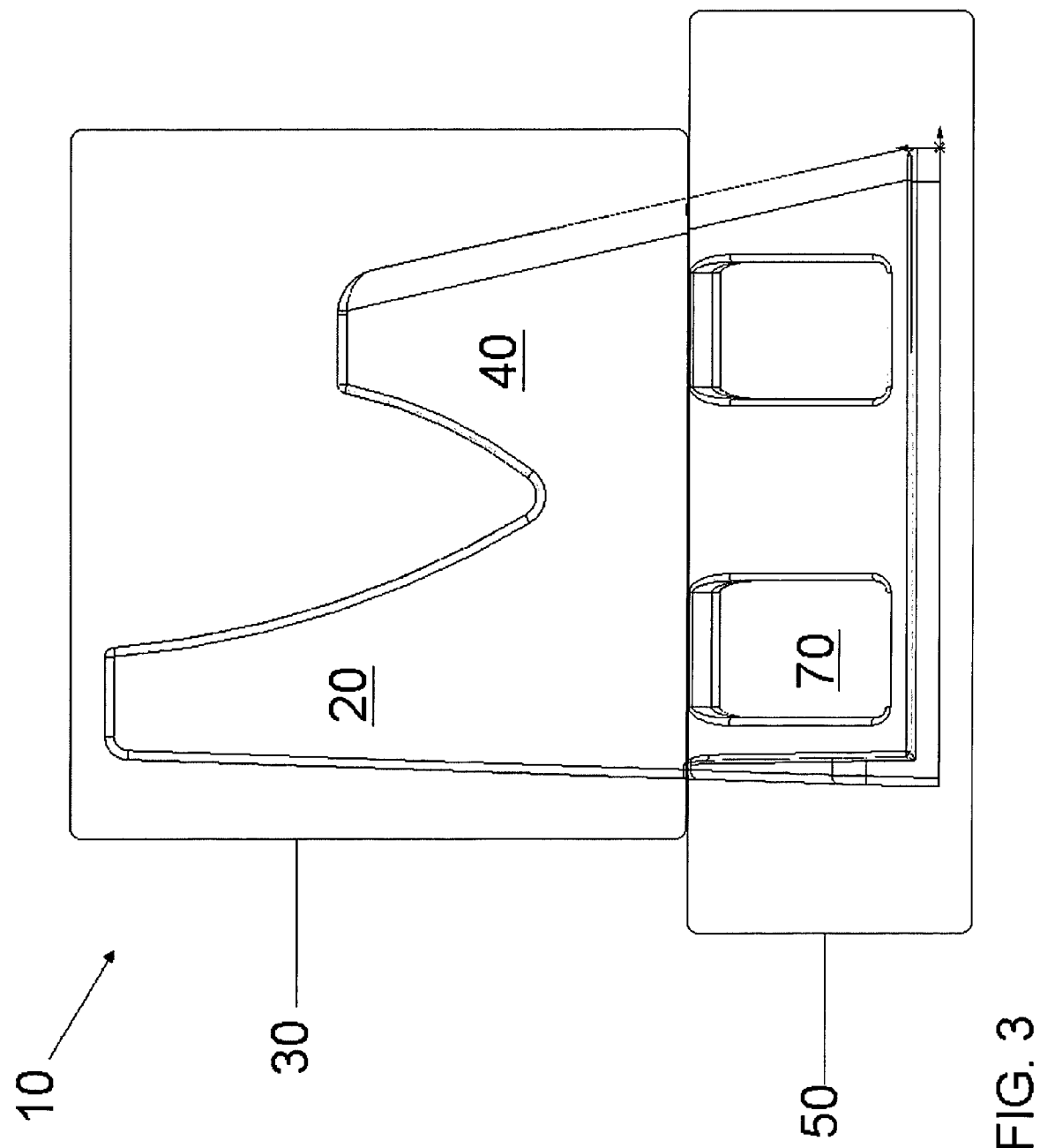
FIG. 3 is a side view of the best mode.
Figure 4:
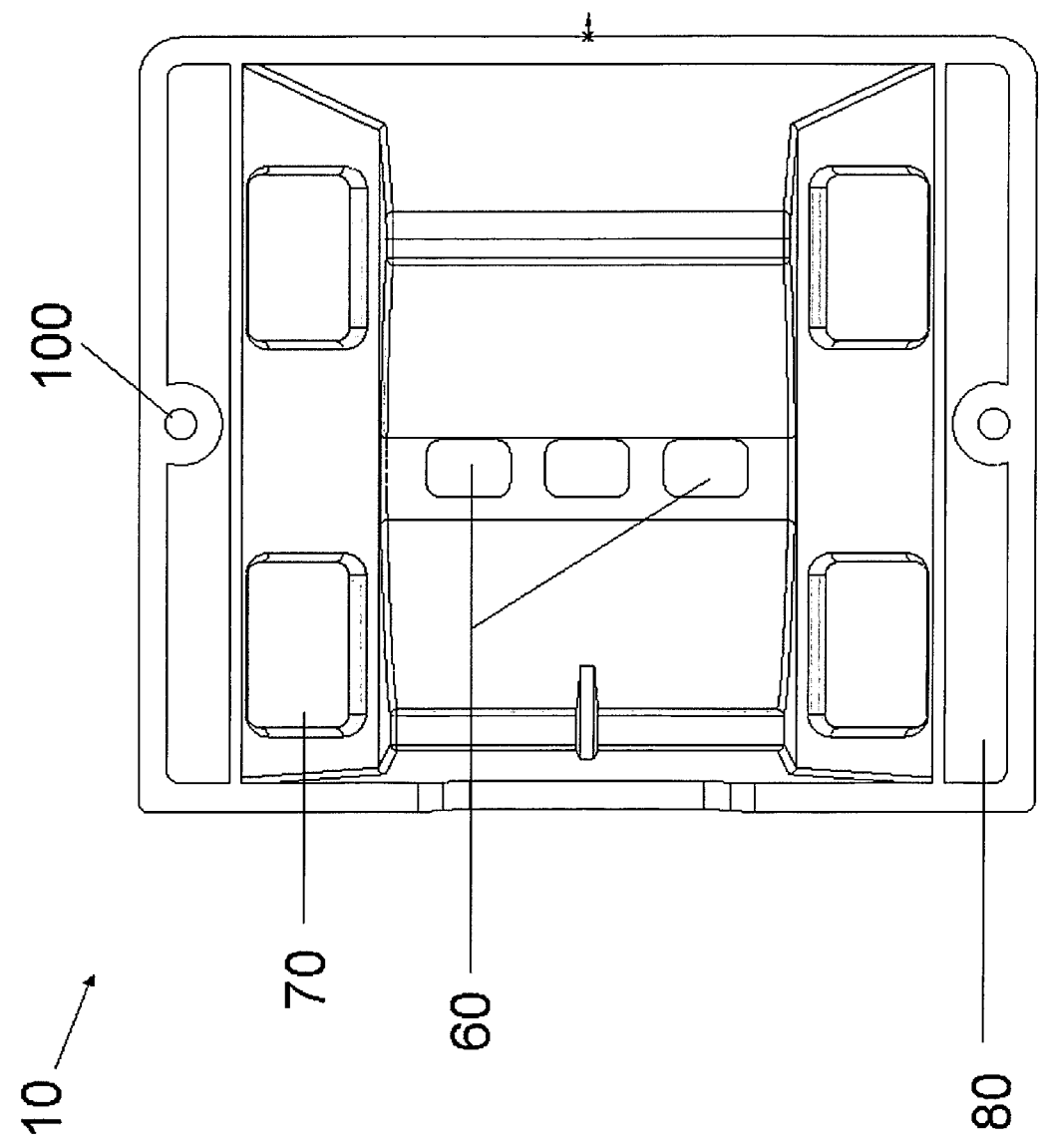
FIG. 4 is a bottom view of the best mode.
Figure 5:
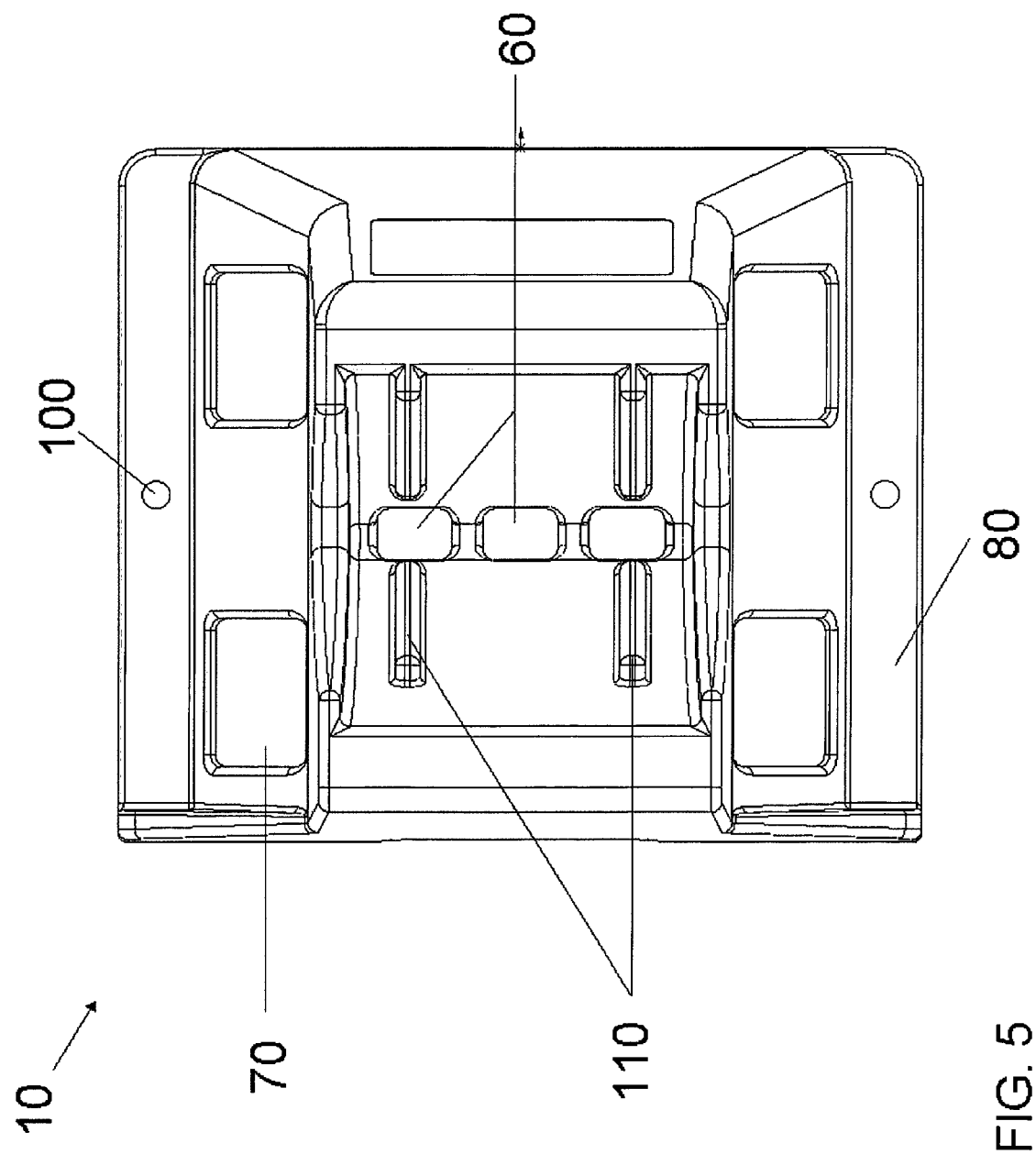
FIG. 5 is a top view of the best mode.
Figure 6:
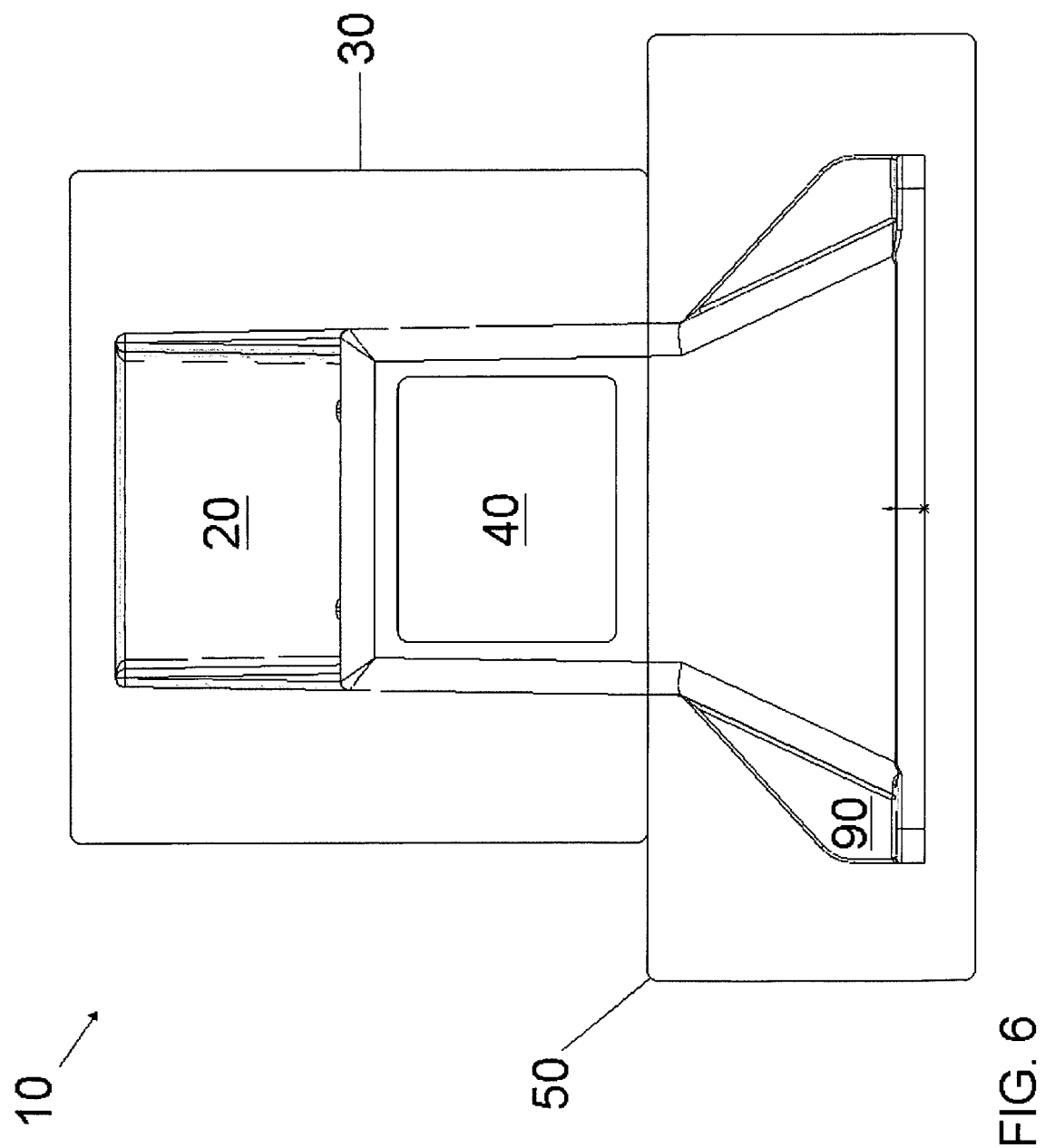
FIG. 6 is a front view of the best mode.

The shellfish holding device 10 comprises a shellfish rest area 30 and a base 50. See FIGS. 3 and 6 for a depiction of the full scope designated by these elements. The shellfish rest area 30 and base 50 are integrated into a one-piece article 10. The shellfish rest area 30 consists of a forward wall 40 and a rearward wall 20. The two walls form a concave area where the shellfish is placed. The shellfish rest area 30 is formed by only two walls 20 and 40 in order to leave open the other two sides of the concave area. Consequently, various sized shellfish can fit into the shellfish rest area 30, i.e. longer shellfish can fit between the walls 20 and 40 and will not be obstructed by additional walls.

Figure 1:
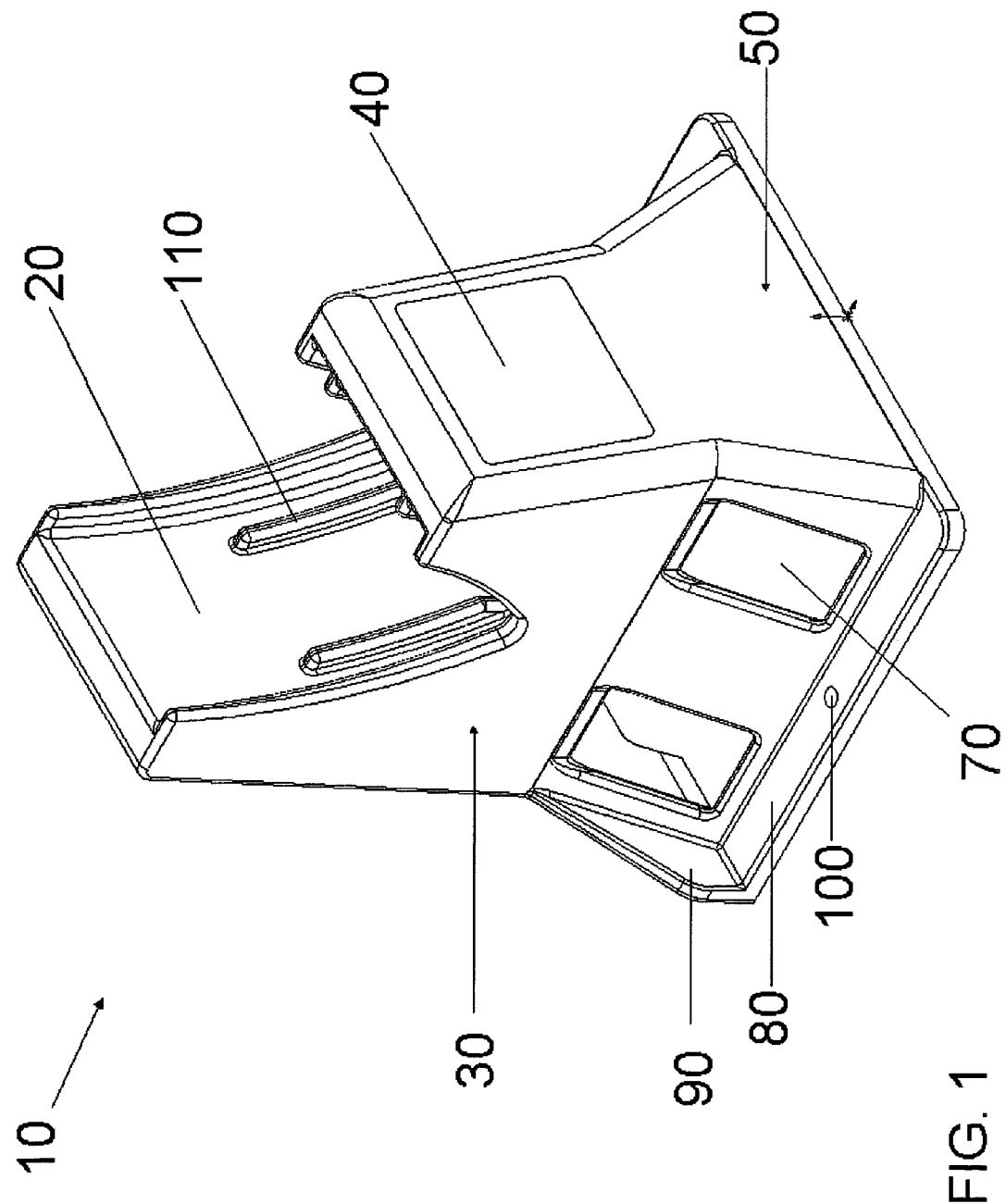
FIG. 1 is a perspective view from a side angle of the best mode.
Figure 2:
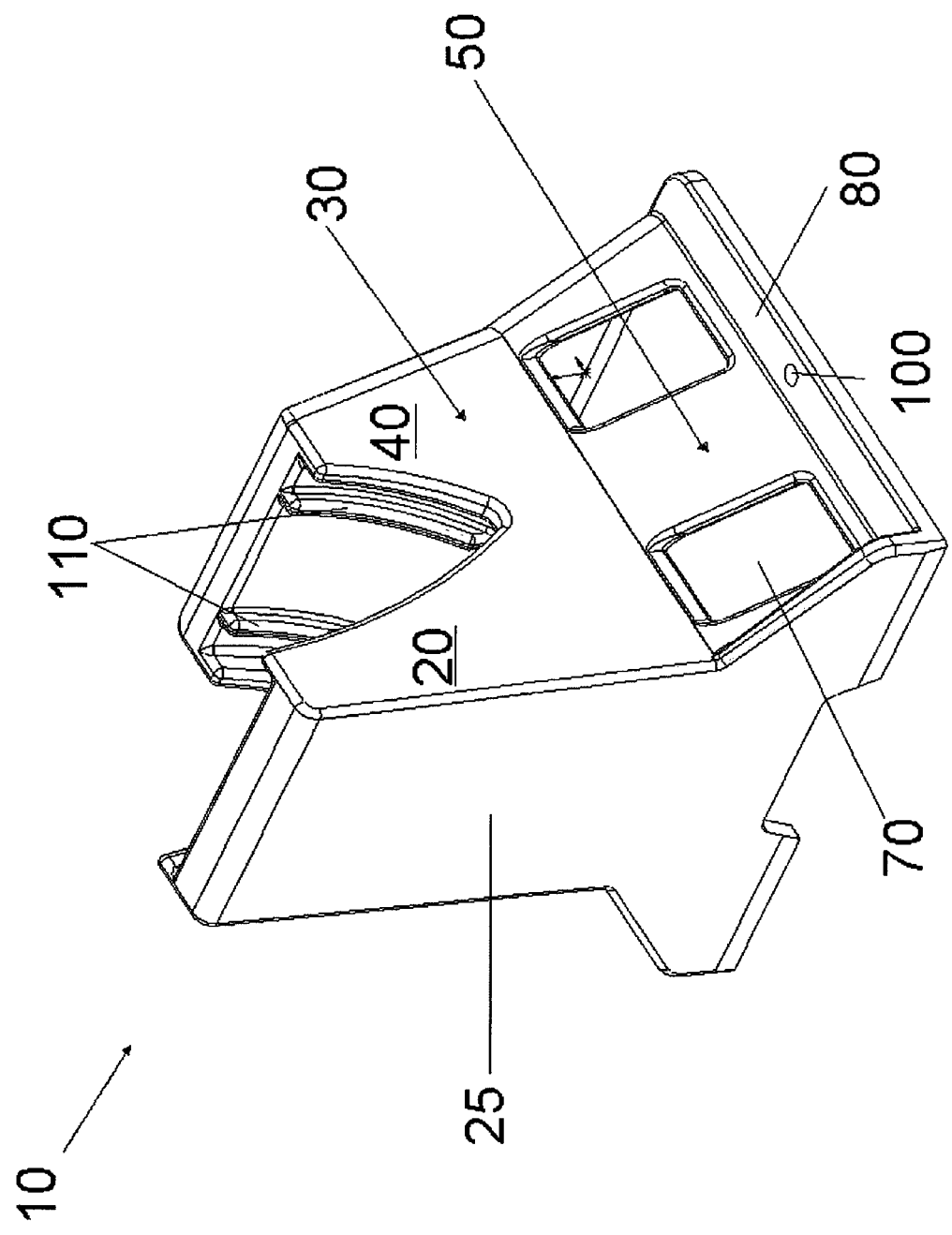
FIG. 2 is perspective view from a rear angle of the best mode.

The shellfish holding device 10 may be used vertically or horizontally. The vertical orientation of the shellfish holding device 10 is depicted in FIGS. 1 and 2. This orientation is designated as vertical because the device 10 stands taller and is narrower in the vertical direction when positioned in this way. A mode of the shellfish holding device 10 includes vertical securing flanges 80 and screw down holes 100, which can be used to secure the device 10 onto a flat horizontal surface, when the device 10 is used in the vertical orientation. The shellfish holding device 10 could also be used in the horizontal position, where the device 10 is placed on its horizontal surface 25. This orientation is designated as horizontal because the shellfish holding device 10 stands shorter and is wider in the horizontal direction when positioned this way. A mode of the shellfish holding device 10 includes horizontal flanges 90, which can be used to secure the device 10 onto a flat horizontal surface, when the device 10 is used in the horizontal orientation. When used in the horizontal direction, the concave area of the device 10 should face the user.

The shellfish rest area 30 further comprises securing ridges 110 and liquor drainage holes 60. Securing ridges 110 help to secure the shellfish inside of the shellfish resting area 30 so the shellfish remains steady as the user pries open the shellfish. The securing ridges 110 help prevent lateral and rotational movement of the shell fish with respect to the shellfish holding device 10.

The liquor drainage holes 60 provide the ability to help capture shellfish liquor or oyster liquor when the shellfish holding device is used vertically. (Oyster liquor is the natural fluid found the oyster along with the oyster meat.) In order to do so, the user should place the invention over a plate or large bowl. As the user opens the shellfish and removes the meat, shellfish liquor then drains through the liquor drainage holes 60 and is collected in the plate or bowl. This aspect of the invention is useful as oyster liquor is often used in the preparation of other seafood entrees or simply to improve enjoyment of consumption of the shellfish from which it came. When used in the horizontal direction, the shellfish holding device 10 can be used to collect oyster liquor in the bottom half of the spent oyster shell, which should lie horizontally on the rearward wall 20 during and after opening the shellfish.

This is the first shellfish holding device to include securing ridges 110 and liquor drainage holes 60 combined into a one-piece article 10 that can be inexpensively manufactured. The securing ridges 110 and liquor drainage holes 60 are relevant to novelty and usefulness as described above. The cost of manufacture is relevant to novelty and usefulness as this invention provides restaurant owners and private consumers with the ability to equip all of their patrons and guests with a shellfish holding device that substantially increases their ability to more quickly and safely open and enjoy shellfish, while not substantially adding to the cost of such more efficient and more safe opening and enjoying of shellfish.

The shellfish holding device 10 provides a safer shellfish opening process because the knife or sharp instrument used to open the shellfish is pressed in the direction of the shellfish resting area 30, rather than in the direction of the user's hand. Without the device 10, the user would simply hold the shellfish in his non-dominant hand and hold the knife in his dominant hand. During the opening process, the knife would be exerted in the direction of the non-dominate hand. Thus, an inadvertent hand movement could lead to a cut hand injury in the non-dominant hand. The shellfish holding device 10 provides a "third hand" so to speak, which could withstand a slip of the knife without causing injury to the user.

The base 50 may include flushing holes 70. Flushing holes 70 are useful when the device 10 is used in the vertical position and is secured to a surface with the vertical securing flanges 80. When the device 10 is secured, it may be difficult to clean the underside of the base 50. Flushing holes 70 allow the under side of the base 50 to be rinsed and washed, without removing and re-securing the shellfish holding device 10 to the horizontal surface or table.

The base 50 may include vertical securing flanges 80. As noted above, the vertical securing flanges 80 provide an attachment means which can be used to attach the shellfish holding device 10 to a horizontal surface. This may be accomplished using screws or other connectors. The connectors could make use of screw down holes 100, which appear on a mode of the invention, or the user may simply use connectors at any location on the vertical securing flanges 80, adding additional screw down holes 100 or by simply driving the screws right into the vertical securing flanges 80 without installing additional holes.

The base 50 may include horizontal securing flanges 90. As noted above, the horizontal securing flanges 90 provide a flange which can be used to attach the shellfish holding device 10 to a horizontal surface. This may be accomplished using screws or other connectors. The connectors can be driven right into the horizontal securing flanges 90.

What is claimed is:

1. A single injection molded article for holding shellfish, comprising:

A base comprising four walls; and a shellfish resting area; wherein:

said base supports, holds steady to a table-like surface, and is located below said shellfish resting area, and said shellfish resting area comprises: 1) a forward wall; 2) a rearward wall; 3) one or more securing ridges; and 4) one or more liquor drainage holes; wherein:

a. said forward wall and said rearward wall each have one inner surface, one outer surface, two end surfaces, and one top surface and each are hollow in the spaces between said surface;

b. said forward wall and said rearward wall each extend upwards from said base to form a V or U shaped vertical cross sectional shape sitting atop said base with a concave area facing upwards, where said forward wall and said rearward wall are each one leg of said V or U shaped vertical cross sectional shape, thereby creating said concave area facing upwards defined by said inner surface of said forward wall on one side and said inner surface of said rearward wall on the other side;

c. said one or more liquor drainage holes is located at the bottom of said concave area facing upwards between said inner surface of said forward wall and said inner surface of said rearward wall;

d. height of said rearward wall extends higher than that of said forward wall; and e. said one or more securing ridges is located in said concave area facing upwards, on said inner surface of said forward wall and said inner surface of said rearward wall, wherein each of said one or more securing ridges traverses vertically essentially the full height of said forward wall and a portion of the height of said rearward wall, each protruding essentially perpendicularly outward from the respective planar surface of said inner surface of said forward wall or said inner surface of said rearward wall at the point which the particular section of said securing ridge is located thereon.

2. An apparatus for holding shellfish as in claim 1, wherein said base further comprises one or more flushing holes, defined as a void in one of said four walls of said base, where said void is effectively sized to allow the removal, by flushing with water, of shellfish debris and shellfish liquid remaining after opening and consuming said shellfish.

3. An apparatus for holding shellfish as in claim 1, wherein said base further comprises one or more vertical securing flanges.

4. An apparatus for holding shellfish as in claim 3, wherein said base further comprises one or more screw down holes.

5. An apparatus for holding shellfish as in claim 1, wherein said base further comprises one or more horizontal securing flanges.

6. An apparatus for holding shellfish as in claim 5, wherein said base further comprises one or more screw down holes.

* * * * *